(12) United States Patent
Christie

(10) Patent No.: US 6,877,084 B1
(45) Date of Patent: Apr. 5, 2005

(54) CENTRAL PROCESSING UNIT (CPU) ACCESSING AN EXTENDED REGISTER SET IN AN EXTENDED REGISTER MODE

(75) Inventor: David S. Christie, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 807 days.

(21) Appl. No.: 09/824,863

(22) Filed: Apr. 2, 2001

Related U.S. Application Data

(60) Provisional application No. 60/224,368, filed on Aug. 9, 2000.

(51) Int. Cl.[7] ............................ G06F 9/30; G06F 12/04; G06F 9/50
(52) U.S. Cl. .......................... 712/203; 712/43; 712/210; 712/227; 712/229; 711/125; 711/212; 711/173
(58) Field of Search ......................... 712/43, 203, 210, 712/229, 213, 300; 711/125, 212, 173, 172

(56) References Cited

U.S. PATENT DOCUMENTS

| | | |
|---|---|---|
| 4,044,338 A | 8/1977 | Wolf |
| 4,050,094 A | 9/1977 | Bourke |

(Continued)

FOREIGN PATENT DOCUMENTS

| | | |
|---|---|---|
| EP | 067 667 | 12/1982 |
| EP | 259 095 | 3/1988 |

(Continued)

OTHER PUBLICATIONS

*The Technology Behind Crusoe™ Processors, Low–Power x86–Compatible Processors Implemented with Code Morphing™ Software*, Transmeta Corporation, Jan. 2000, pp. 1–18.

*Alpha Learns to Do Windows; Digital's FX!32 is The Key To Running Win32 Software on Alpha/Windows NT.*, Selinda Chiquoine, BYTE, Aug. 4, 1998, 4 pages.

*Awards Stack Up for DIGITAL FX!32 Windows Compatibility Software for ALPHA*, DIGITAL Press Releases, Dec. 11, 1997, 7 pages.

(Continued)

*Primary Examiner*—Daniel H. Pan
(74) *Attorney, Agent, or Firm*—Meyertons Hood Kivlin Kowert & Goetzel, P.C.; B. Noël Kivlin

(57) ABSTRACT

A central processing unit (CPU) is described including a register file and an execution core coupled to the register file. The register file includes a standard register set and an extended register set. The standard register set includes multiple standard registers, and the extended register set include multiple extended registers. The execution core fetches and executes instructions, and receives a signal indicating an operating mode of the CPU. The execution core responds to an instruction by accessing at least one extended register if the signal indicates the CPU is operating in an extended register mode and the instruction includes a prefix portion including information needed to access the at least one extended register. The standard registers may be general purpose registers of a CPU architecture associated with the instruction. The number of extended registers may be greater than the number of general purpose registers defined by the CPU architecture. In this case, the additional register identification information in the prefix portion is needed to identify a selected one of the extended registers. A width of the extended registers may also be greater than a width of the standard registers. In this case, the prefix portion may also include an indication that the entire contents of the least one extended register is to be accessed. In this way, instruction operand sizes may selectively be increased when the CPU is operating in the extended register mode. A computer system including the CPU is also described.

39 Claims, 9 Drawing Sheets

U.S. PATENT DOCUMENTS

| | | | |
|---|---|---|---|
| 4,109,311 A | | 8/1978 | Blum et al. |
| 4,385,352 A | | 5/1983 | Bienvenu |
| 4,453,212 A | | 6/1984 | Gaither et al. |
| 4,679,140 A | * | 7/1987 | Gotou et al. ................ 712/229 |
| 4,807,115 A | | 2/1989 | Torng |
| 4,835,734 A | | 5/1989 | Kodaira et al. |
| 4,858,105 A | | 8/1989 | Kuriyama et al. |
| 4,926,322 A | | 5/1990 | Stimac et al. |
| 4,928,223 A | | 5/1990 | Dao et al. |
| 4,972,338 A | | 11/1990 | Crawford et al. |
| 5,053,631 A | | 10/1991 | Perlman et al. |
| 5,058,048 A | | 10/1991 | Gupta et al. |
| 5,109,334 A | | 4/1992 | Kamuro |
| 5,125,087 A | | 6/1992 | Randell |
| 5,129,067 A | | 7/1992 | Johnson |
| 5,136,697 A | | 8/1992 | Johnson |
| 5,226,126 A | | 7/1993 | McFarland et al. |
| 5,226,130 A | | 7/1993 | Favor et al. |
| 5,226,132 A | | 7/1993 | Yamamoto et al. |
| 5,274,834 A | | 12/1993 | Kardach et al. |
| 5,293,592 A | | 3/1994 | Fu et al. |
| 5,303,358 A | | 4/1994 | Baum |
| 5,321,836 A | | 6/1994 | Crawford et al. |
| 5,375,213 A | | 12/1994 | Arai |
| 5,438,668 A | | 8/1995 | Coon et al. |
| 5,471,593 A | | 11/1995 | Branigin |
| 5,481,684 A | | 1/1996 | Richter et al. |
| 5,560,032 A | | 9/1996 | Nguyen et al. |
| 5,561,784 A | | 10/1996 | Chen et al. |
| 5,630,149 A | * | 5/1997 | Bluhm ................ 712/217 |
| 5,651,125 A | | 7/1997 | Witt et al. |
| 5,655,125 A | * | 8/1997 | Cloud et al. ................ 713/300 |
| 5,689,672 A | | 11/1997 | Witt et al. |
| 5,758,116 A | | 5/1998 | Lee et al. |
| 5,768,574 A | | 6/1998 | Dutton et al. |
| 5,809,273 A | | 9/1998 | Favor et al. |
| 5,822,778 A | | 10/1998 | Dutton et al. |
| 5,838,984 A | | 11/1998 | Nguyen et al. |
| 5,848,284 A | | 12/1998 | Sharangpani |
| 5,903,919 A | | 5/1999 | Myers |
| 5,905,900 A | | 5/1999 | Combs et al. |
| 5,935,240 A | | 8/1999 | Mennemeier et al. |
| 6,014,739 A | | 1/2000 | Christie |
| 6,145,049 A | | 11/2000 | Wong |
| 6,157,996 A | | 12/2000 | Christie et al. |
| 6,418,527 B1 | * | 7/2002 | Rozenshein et al. ........ 712/208 |

FOREIGN PATENT DOCUMENTS

| | | |
|---|---|---|
| EP | 369 396 | 5/1990 |
| EP | 381 471 | 8/1990 |
| EP | 425 410 | 5/1991 |
| EP | 459 232 | 12/1991 |
| EP | 467 152 | 1/1992 |
| EP | 942 357 | 9/1999 |
| GB | 2263985 | 8/1993 |
| GB | 2263987 | 8/1993 |
| GB | 2281422 | 3/1995 |

OTHER PUBLICATIONS

*DIGITAL FX!32; White Paper: How DIGITAL FX!32 Works,* DIGITAL Semiconductor, Jan. 26, 1998, 4 pages.

*An Alpha in PC Clothing; Digital Equipment's New x86 Emulator Technology Makes An Alpha System a Fast x86 Clone,* Tom Thompson, BYTE, Aug. 4, 1998, 7 pages.

*AMD 64–Bit Technology; The AMD x86 Architecture Programmers Overview,* AMD, Publication #24108 Rev: A, Aug. 2000, pp. 1–106.

*AMD 64–Bit Technology; The AMD x86–64 Architecture Programmers Overview,* AMD, Pulication #24108 Rev: C, Jan. 2001, pp. 1–128.

*Intel486 DX Microprocessor,* Intel, 6 pages.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

"*Intel Architecture Software Developer's Manual, vol. 1: Basic Architecture*", Intel Corporation, Prospect IL, 1996, 1997, Chapter 8: Programming With The Intel MMX™ Technology, pp. 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

Intel, "Pentium Processor Family User's Manual, vol. 1: Pentium Processor Family Data Book," 1994, 2–1 to 2–4.

Kathail et al., HPL Playdoh Architecture Specification: Version 1.0, Hewlett Packard, Computer Systems Laboratory, HPL–93–80, Feb., 1994, pp. 1–48.

IEEE Micro, vol. 13, No. 5, Oct. 1, 1993, pp. 24–36, Makato Awaga et al, "The VP 64–Bit Vector Coprocessor: A New Implementation of High–Performance Numerical Computation."

Intel Microprocessors: vol. II, 1993, pp. 2–2, 2–19 to 2–26, 2–80 to 2–83 and 2–122.

Intel Microprocessors: vol. I, 1993, pp. 2–1, 2–18 to 2–26, 2–79 to 2–83 and 2–121 to 2–122.

International Search Report, PCT/US 01/24738, mailed Jan. 4, 2002.

* cited by examiner

CENTRAL PROCESSING UNIT (CPU) ACCESSING AN EXTENDED REGISTER SET IN AN EXTENDED REGISTER MODE

This application claims benefit of priority to Provisional Application Ser. No. 60/224,368 filed Aug. 9, 2000.

BACKGROUND OF THE INVENTION

1. Field of the Invention

This invention relates to microprocessors and more particularly to mechanisms for expanding register address space within an existing microprocessor architecture.

2. Description of the Related Art

Microprocessor manufacturers continue to develop new products which execute x86 instructions in order to maintain compatibility with the vast amount of software developed for previous 80x86 generations—the 8086/8, 80286, 80386, and 80486. Maintaining software compatibility has forced many architectural compromises in newer products. In order to retain the functions of earlier products, microprocessor hardware has often been simply modified or extended in order to increase capability and performance.

The x86 instruction set is relatively complex and is characterized by a plurality of variable byte length instructions. FIG. 1 is a generic format of an x86 instruction 10. In x86 instruction 10, several optional prefix bytes 12 may precede 1–2 operation code (opcode) bytes in an opcode field 14. An optional addressing mode (Mod RIM) byte 16 may follow opcode field 14. An optional scale-index-base (SIB) byte 18 may follow optional Mod R/M byte 16. An optional displacement field 20 may follow optional SIB byte 18, and an optional immediate data field 22 may follow optional displacement field 20. Optional displacement field 20 contains a constant used in address calculations, and optional immediate field 22 contains a constant used as an instruction operand.

The 1–2 opcode bytes in opcode field 14 define the basic operation of x86 instruction 10. The basic operation typically involves at least one operand. As the x86 architecture does not permit memory-to-memory transfers, at least one of the operands will always be a register (i.e., a register operand). The three least significant bits of an opcode byte may specify a register operand. The shortest x86 instructions are only one byte long, and comprise a single opcode byte. It is noted that the 80286 sets a maximum length for an x86 instruction at 10 bytes, while the 80386 and 80486 both allow x86 instruction lengths of up to 15 bytes.

The operation of an x86 instruction may be modified by prefix bytes 12. For example, a prefix byte 12 may change the address or operand size of the x86 instruction, override the default segment used in memory addressing, or instruct a processor executing the x86 instruction to repeat a string operation a number of times. It is noted that the size of an instruction operand refers to the number of bits in the operand, or the "width" of the operand in bits.

Optional Mod R/M byte 16 specifies registers used as well as memory addressing modes. FIG. 2 illustrates the fields of Mod RIM byte 16. As illustrated in FIG. 2, Mod R/M byte 16 is divided into three fields: a mode (MOD) field, a register/opcode (REG/OP) field, and a register/memory (RIM) field. The contents of the MOD field determine how the RIM field and displacement field 20 are interpreted. The REG/OP field is used either to specify a register operand or to hold additional opcode bits. The R/M field specifies either a register operand or a memory operand dependent upon the contents of the MOD field.

Optional SIB byte 18 is used only in 32-bit base-relative addressing using scale and index factors. FIG. 3 illustrates the fields of SIB byte 18. As illustrated in FIG. 3, SIB byte 18 is divided into three fields: a SCALE field, and INDEX field, and a BASE field. The BASE field specifies which register contains a base value for an address calculation. The INDEX field specifies which register contains an index value for the address calculation, and the SCALE field specifies the power of two by which the index value will be multiplied before being added, along with any displacement, to the base value.

References to a particular register of the x86 architecture may appear within the three least significant bits of an opcode byte, the REG/OP field of optional Mod R/M byte 16, the RIM field of optional Mod R/M byte 16, or the BASE and INDEX fields of optional SIB byte 18. Thus there are four possible references to a register in an x86 instruction. As described above, the three least significant bits of an opcode byte may specify a register operand. The REG/OP and R/M fields of Mod R/M byte 16 can specify source and destination registers. The BASE and INDEX fields of SIB byte 18 can specify registers containing base and index values used in operand address calculations for memory accesses. It is noted that only three of the four register references may appear in any particular x86 instruction.

A significant deficiency of the x86 architecture is the relatively small number of general purpose registers. The x86 architecture currently defines eight 32-bit general purpose registers: the EAX, EBX, ECX, EDX, ESP, EBP, ESI, and EDI registers. In contrast, typical RISC processors have at least thirty-two general purpose registers. A larger register set allows more operands to be stored in the relatively fast access register file, rather than in relatively slow access memory. Modern compilers are also able to take advantage of a larger number of registers to expose greater instruction level parallelism for increased superscalar execution performance. In addition to the limited number of x86 registers, use of them by the compiler is complicated by the fact that most have special implicit uses in various instructions.

SUMMARY OF THE INVENTION

A central processing unit (CPU) is described including a register file and an execution core coupled to the register file. The register file includes a standard register set and an extended register set. The standard register set includes multiple standard registers, and the extended register set include multiple extended registers. The execution core fetches and executes instructions, and receives a signal indicating an operating mode of the CPU. The execution core responds to an instruction by accessing at least one extended register if the signal indicates the CPU is operating in an extended register mode and the instruction includes a prefix portion including information needed to access the at least one extended register. A computer system including the CPU is also described.

The standard registers may be general purpose registers defined by a CPU architecture associated with the instruction. For example, the standard registers may be general purpose registers defined by the x86 architecture, and the instruction may be an instruction of the x86 instruction set. The number of standard registers may be less than or equal to a number of general purpose registers defined by the CPU architecture, and the number of extended registers may be greater than the number of general purpose registers defined by the-CPU architecture. In this case, the instruction absent the prefix portion may include register identification information sufficient to identify a selected one of the standard registers. However, as the number of extended registers exceeds the number of general purpose registers defined by the CPU architecture, the register identification information may be insufficient to identify a selected one of the extended registers. The prefix portion of the instruction includes additional register identification information needed to identify a selected one of the extended registers. The encoding of the instruction, including the prefix portion, may thus identify the at least one extended register accessed by the execution core.

In one embodiment, the standard register set includes eight 32-bit general purpose registers defined by the x86 architecture. The eight 32-bit general purpose registers may include, for example, the EAX, EBX, ECX, EDX, ESP, EBP, ESI, and EDI registers. The extended register set may include the eight 32-bit general purpose registers of the standard register set and eight additional 32-bit registers not defined by the x86 architecture. The execution core may be configured to fetch and execute variable-length x86 instructions.

The prefix portion may include an extended register prefix byte, and the extended register prefix byte may include an extended register key field. The contents of the extended register key field may indicate whether or not the extended register prefix byte includes the information needed to access the at least one extended register. For example, the extended register prefix byte may include the information needed to access the at least one extended register only when the extended register key field contains a predetermined extended register key value (e.g., the binary value '0100').

The CPU may include a control register for storing information indicating whether or not the extended register mode is globally enabled, a flags register for storing information indicating whether or not the extended register mode is enabled by a current process, and generating means for generating the signal indicating the operating mode of the CPU. The signal may indicate the CPU is operating in the extended register mode when the extended register mode is globally enabled and enabled by the current process.

The standard register set may include multiple general purpose registers defined by a CPU architecture (e.g., the x86 architecture), and a width of the extended registers of the extended register set may be greater than a width of the standard registers. The width of a register is the total number of bits in the register. The execution core may respond to the instruction by accessing the entire contents of the at least one extended register if: (i) the signal indicates the CPU is operating in an extended register mode, (ii) the instruction includes a prefix portion including information needed to access the at least one extended register, and (iii) the prefix portion includes an indication that the entire contents of the least one extended register is to be accessed. In this way, instruction operand sizes may selectively be increased when the CPU is operating in the extended register mode. The standard register set may be a subset of the extended register set, and the standard registers may form lower ordered (i.e., least significant) portions of extended registers.

In addition to the extended register key field described above, the extended register prefix byte may include an operand size override bit. The value of the operand size override bit may indicate whether or not the entire contents of the least one extended register is to be accessed. It is noted that the size of an instruction operand refers to the number of bits in the operand, or the "width" of the operand in bits.

Figure 1:
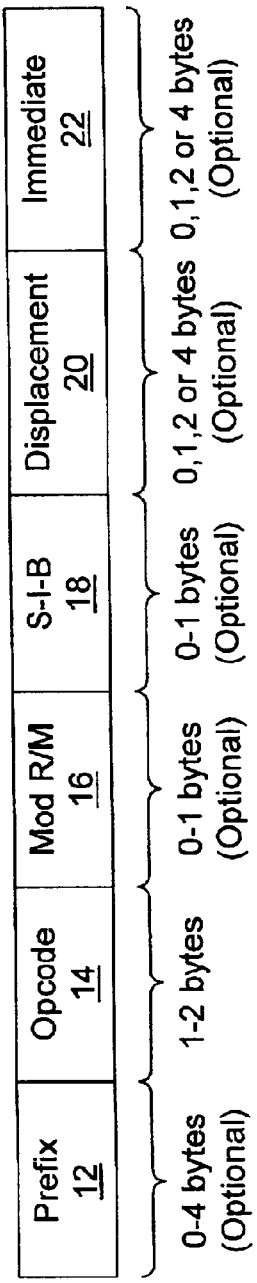
FIG. 1 is a generic format of an x86 instruction, wherein the x86 instruction includes an optional addressing mode (Mod R/M) byte and an optional scale-index-base (SIB) byte.
Figure 2:
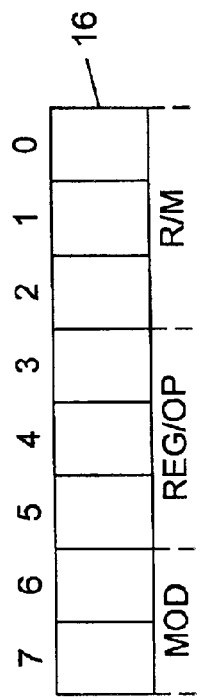
FIG. 2 illustrates the fields of the Mod R/M byte of the x86 instruction of FIG. 1.
Figure 3:
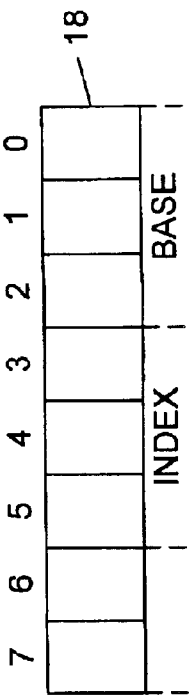
FIG. 3 illustrates the fields of the SIB byte of the x86 instruction of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 4:
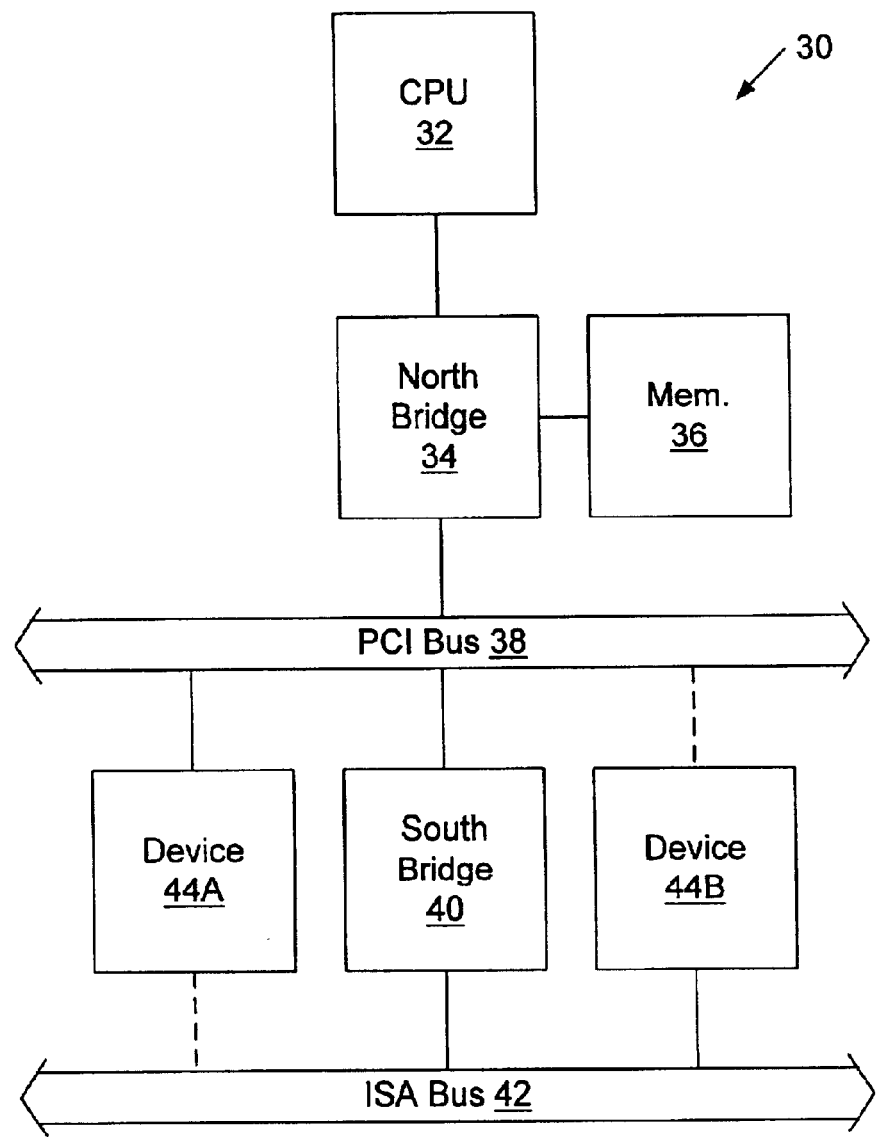
FIG. 4 is a diagram of one embodiment of a computer system including a central processing unit (CPU)

FIG. 4 is a diagram of one embodiment of a computer system 30 including a central processing unit (CPU) 32, a north bridge 34, a memory 36, a peripheral component interconnect (PCI) bus 38, a south bridge 40, and an industry standard architecture (ISA) bus 42. CPU 32 executes instructions stored within memory 36 (e.g., x86 instructions). North bridge 34 forms an interface between CPU 32, memory 36, and PCI bus 38. Memory 36 may include, for example, semiconductor read only memory (ROM) and/or semiconductor random access memory (RAM). South bridge 40 forms an interface between PCI bus 38 and ISA bus 42.

Computer system 30 also includes a first device 44A coupled to PCI bus 38, and a second device 44B coupled to ISA bus 42. Device 44A may be, for example, an input/output (I/O) device such as a modem, a sound card, a network adapter, etc. As indicated in FIG. 4, device 44A may be coupled to ISA bus 42 rather than PCI bus 38. Device 44B may be, for example, a peripheral device such as a hard disk drive, a floppy disk drive, a compact disk read-only memory (CD-ROM) drive, etc. As indicated in FIG. 4, device 44B may be coupled to PCI bus 38 rather than ISA bus 42.

CPU 32 fetches (or transfers) instructions from memory 36 via north bridge 34 and executes the instructions. Data stored in memory 36 may be operated upon by the instructions. Instructions and data reside at addresses within memory 36, wherein an address is a value which identifies a storage location or locations within memory 36. Addresses of instructions and data may be translated by CPU 32 prior to being provided to north bridge 34. In this case, CPU 32 may include address translation hardware, and memory 36 may store address translation information used by CPU 32 to translate virtual addresses to physical addresses.

As described below, CPU 32 includes an internal cache memory (i.e., an internal cache) configured to store instructions and data previously accessed by CPU 32. Computer system 30 may also include an external cache configured to store instructions and data previously accessed by CPU 32. It is understood that information referred to as being stored in memory 36 may be stored in the internal cache of CPU 32 or an external cache of computer system 30.

Figure 5:
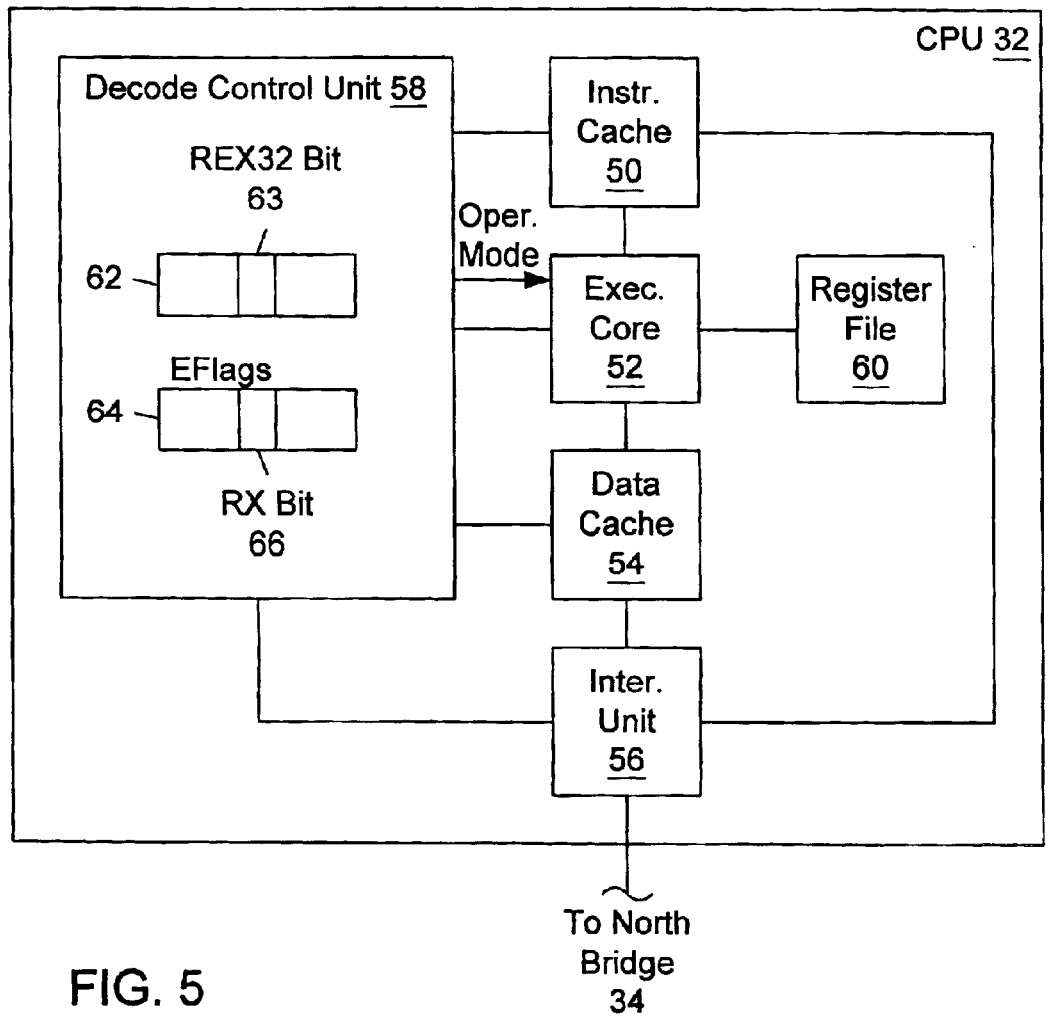
FIG. 5 is a diagram of one embodiment of the CPU of FIG. 4, wherein the CPU includes an execution core coupled to a register file.

FIG. 5 is a diagram of one embodiment of CPU 32 of FIG. 4. Other embodiments of CPU 32 are possible and contemplated. In the embodiment of FIG. 5, CPU 32 includes an instruction cache 50, an execution core 52, a data cache 54, an interface unit 56, a decode control unit 58, and a register file 60. Instruction cache 50 is coupled to execution core 52, decode control unit 58, and interface unit 56. Execution core 52 is coupled to decode control unit 58, register file 60, and data cache 54. Data cache 54 is coupled to execution core 52, decode control unit 58, and interface unit 56. Interface unit 56 is coupled to instruction cache 50, data cache 54, decode control unit 58, and north bridge 34 (FIG. 4).

Decode control unit 58 includes a control register 62. Decode control unit 58 also includes a flags register 64 used to report and control the status of CPU 32. Flags register 64 may be an x86 flags register. Modem x86 processors include a 32-bit extended flags or "EFLAGS" register. Flags register 34 is thus preferably the 32-bit EFLAGS register of modem x86 processors.

Generally speaking, CPU 32 employs a processor architecture compatible with the x86 architecture and includes additional architectural features to support 64-bit processing. CPU 32 is configured to establish an operating mode in response to enable indications stored in control register 62 and flags register 64.

As used herein, an "operating mode" of CPU 32 specifies default values for various programmably selectable processor attributes. In the described embodiments, the operating mode of CPU 32 specifies a default operand size. It is noted that the size of an instruction operand refers to the number of bits in the operand, or the "width" of the operand in bits. As described in detail below, the encoding of an instruction may override the default operand size.

In the embodiment of FIG. 5, decode control unit 58 generates an operating mode signal indicating an operating mode of CPU 32, and provides the operating mode signal to execution core 52. Execution core 52 executes instructions dependent upon the operating mode signal (i.e., the operating mode of CPU 32). Operating modes of CPU 32 include a "32-bit compatibility" mode and a "32-bit register extension" or "REX32" mode. In both the 32-bit compatibility mode and the REX32 mode, the default operand size is 32 bits. In REX32 mode, instructions may override the default 32-bit operand size with a 64-bit operand size according to encodings of the instructions as described below. Further, as will be described in detail below, field extension bits may be included in encodings of instructions in REX32 mode 74 to increase the number of registers which may be referenced in the instructions.

The REX32 mode is enabled by a "REX32" bit 63 in control register 62 and an "RX" bit 66 in flags register 64. REX32 bit 63 provides a global enable of the REX32 mode. For example, REX32 mode may be enabled when a logical value of '1' is stored in REX32 bit 63, and REX32 mode may be disabled when a logical value of '0' is stored in REX32 bit 63. REX32 bit 63 is preferably written by code having a relatively high access or privilege level (e.g., "privileged code" such as an operating system, a basic input output system or BIOS, or a supervisor-mode utility).

It is noted that control register 62 may be one of the control registers defined by the current state of the x86 architecture, and may thus be accessed using well know techniques. For example, REX32 bit 63 may be a bit in one of the currently defined 32 bit control registers CR0–CR4. Alternatively, control register 62 may be one of the model-specific registers defined by the current state of the x86 architecture, and may thus be accessed using the existing read model-specific register (RDMSR) and write model-specific register (WRMSR) instructions.

RX bit 66 provides a process-specific enable of the REX32 mode. An application program currently being executed by CPU 32 (i.e. a current process) may enable REX32 mode by setting RX bit 66. REX32 mode must be enabled by REX32 bit 63 before the process can enter REX32 mode by setting RX bit 66. When REX32 mode is enabled by REX32 bit 63, the current process may enter REX32 mode by storing a logical value of '1' in RX bit 66. Only when REX32 bit 64 and RX bit 66 are both set does decode control unit 58 generate the operating mode signal indicating the REX32 mode. The current process may-exit REX32 mode by storing a logical value of '0' in RX bit 66.

Two new x86 instructions introduced herein may be used by application programs to set and clear RX bit 66 in flags register 64. A new "STX" instruction stores a logical value of '1' in REX32 bit 63, and anew "CLX" instruction stores a logical value or '0' in REX32 bit 63. The STX and CLX instructions preferably take effect immediately following execution of the instructions. Use of the STX and CLX instructions when REX32 mode is not enabled (i.e., is disabled) by REX32 bit 63 may result in an "undefined opcode" exception.

As described above, the operating mode defines a default operand size. If the encoding of a particular instruction does not override the default operand size, execution core 52 performs operations involving operands having the default operand size. On the other hand, if the encoding of the instruction overrides the default operand size, execution core 52 performs operations involving operands having the overriding operand size.

Execution core 52 fetches register operands from register file 60, and fetches memory operands from data cache 54. If the memory operands are cacheable and present within data cache 54, data cache 54 provides the memory operands to execution core 52. If the memory operands are not cacheable or not present within data cache 54, data cache 54 obtains the memory operands from memory 36 via interface unit 56 and north bridge 34 (FIG. 4), and provides the memory operands to execution core 52.

Figure 6:
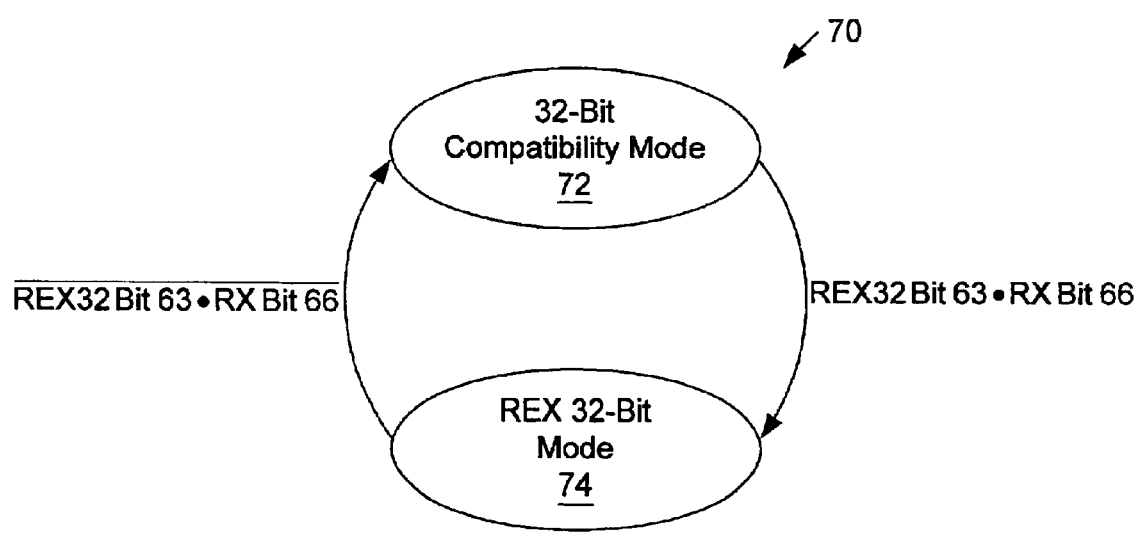
FIG. 6 is a diagram illustrating transitions between a "32-bit compatibility" mode of the CPU of FIG. 5 and a "32-bit register extension" (REX32) mode of the CPU.

FIG. 6 is a diagram 70 illustrating transitions between the 32-bit compatibility mode, labeled 72, and the REX32 mode, labeled 74, of CPU 32 of FIG. 5. As described above, the default operand size is 32 bits in both 32-bit compatibility mode 72 and REX32 mode 74. However, in REX32 mode, instructions may override the default 32-bit operand size with a 64-bit operand size according to encodings of the instructions. Further, as will be described in detail below, field extension bits may be included in encodings of instructions in REX32 mode 74 to increase the number of registers which may be referenced in the instructions.

As indicated in FIG. 6, when CPU 32 is operating in 32-bit compatibility mode 72, CPU 32 transitions to REX32 mode 74 when global enable REX32 bit 63 and process-specific enable RX bit 66 both have logic values of '1'. As described above, privileged code such as an operating system, a basic input output system or BIOS, or a supervisor-mode utility, may store a logic '1' in global enable REX32 bit 63. An application program currently being executed by CPU 32 (i.e., a current process) with CPU 32 operating in 32-bit compatibility mode 72 may store a logic '1' in RX bit 66 to enter REX32 mode 74. CPU 32 transitions from REX32 mode 74 to 32-bit compatibility mode 72 when either global enable REX32 bit 64 or process-specific enable RX bit 66 is a logic '0'. For example, the current process with CPU 32 operating in REX32 mode 74 may store a logic '0' in RX bit 66 in order to exit REX32 mode 74 and return to 32-bit compatibility mode 72.

Referring back to FIG. 5, it is noted that CPU 32 may also include a memory management unit having paging hardware to implement paging address translation from virtual addresses to physical addresses. A "virtual address" is an address generated prior to translation via an address translation mechanism (e.g. a paging mechanism) to a "physical address", which is the address actually used to access a memory. The paging hardware may include a translation lookaside buffer (TLB) to store page translations.

Instruction cache 50 is a high speed cache memory for storing instructions. Execution core 52 fetches instructions from instruction cache 50 for execution. Instruction-cache 50 may employ any suitable cache organization, including direct-mapped, set associative, and fully associative configurations. If a requested instruction is not present in instruction cache 50, instruction cache 50 may communicate with interface unit 56 to obtain the requested instruction. Such communication may result in the filling/replacement of a cache line in instruction cache 50. Additionally, instruction cache 50 may communicate with the memory management unit to receive physical address translations for virtual addresses fetched from instruction cache 50.

Execution core 52 executes instructions fetched from instruction cache 50. Execution core 52 obtains register operands from register file 60, and stores register result values within register file 60. The size of operands is dependent upon the operating mode of CPU 32, and may be overridden by instructions as described below. Execution core 52 obtains memory operands from data cache 54, and provides memory result values to data cache 54 as described below.

Execution core 52 may employ any suitable construction. For example, execution core 52 may be a superpipelined core, a superscalar core, or a combination thereof. Execution core 52 may employ out of order speculative execution or in order execution, according to design choice.

Data cache 54 is a high speed cache memory configured to store data. Data cache 54 may employ any suitable cache organization, including direct-mapped, set associative, and fully associative configurations. If the value of a memory operand is not present in data cache 54, data cache 54 may communicate with interface unit 56 to access the memory operand. Such communication may result in the filling/replacement of a cache line within data cache 54. Additionally, if data cache 54 employs a write back caching policy; updated cache lines being replaced may be communicated to interface unit 56 to be written back to memory. Data cache 54 may communicate with the memory management unit to receive physical address translations for virtual addresses presented to data cache 54.

Interface unit 56 communicates with north bridge 34 (FIG. 4). In response to requests from instruction cache 50, interface unit 56 obtains instructions from memory 36 (FIG. 4) via north bridge 34 and provides the instructions to instruction cache 50. Interface unit 56 also conveys memory operands between north bridge 34 and data cache 54 as described above.

Figure 7:
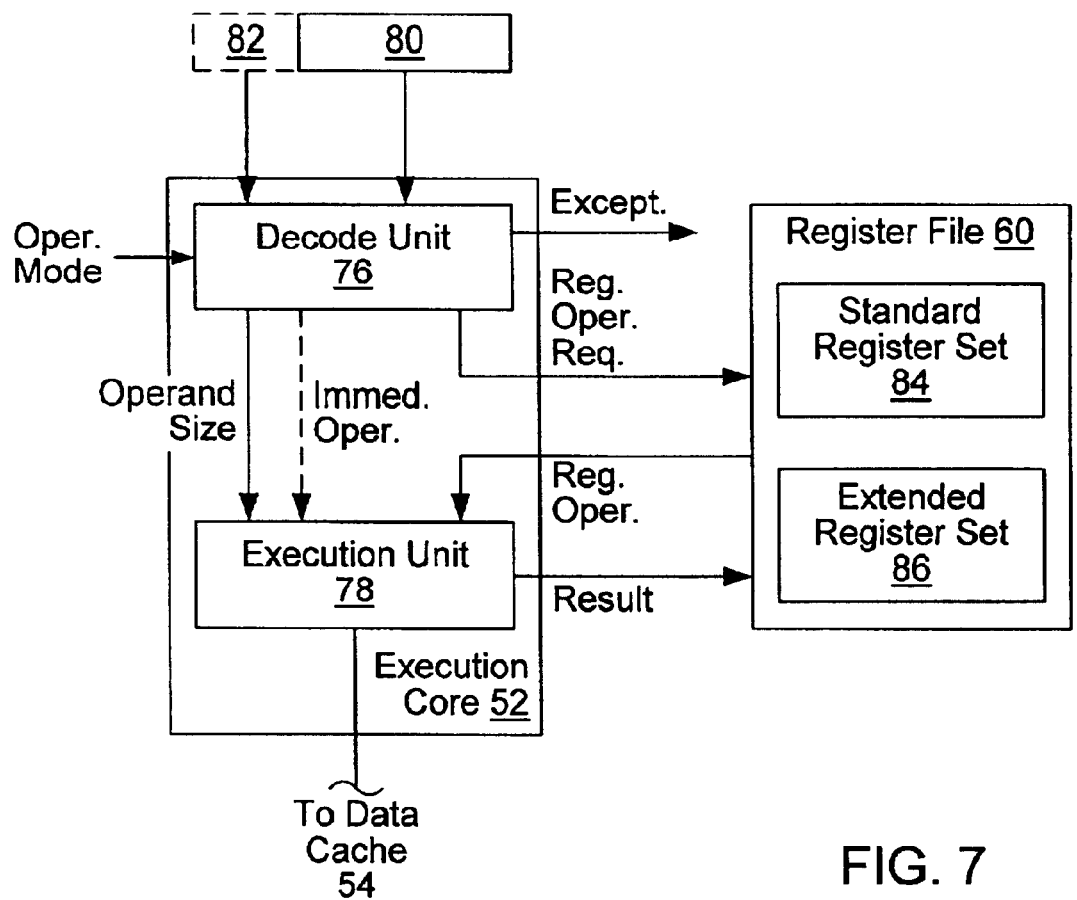
FIG. 7 is a diagram of exemplary embodiments of the execution core and the register file of FIG. 5, wherein the execution core includes a decode unit coupled to an execution unit and to the register file, and wherein the register file includes a standard register set and an extended register set, and wherein the decode unit is shown receiving a representative instruction, and wherein the instruction may include an optional prefix portion.

FIG. 7 is a diagram of exemplary embodiments of execution core 52 and register file 60 of FIG. 5. In the embodiment of FIG. 5, execution core 52 includes a decode unit 76 coupled to an execution unit 78 and to register file 60. Generally speaking, decode unit 76 decodes instructions fetched from instruction cache 50 (FIG. 5). In FIG. 7, decode unit 76 is shown receiving a representative instruction 80. Instruction 80 is preferably an x86 instruction, and may have an optional prefix portion 82. As described below, prefix portion 82 includes information needed to access the at least one extended register.

Decode unit 76 detects any register source operand references in instructions and requests the operand values from register file 60. Register file 60 conveys the requested source operand values to execution unit 78. Simultaneously (e.g., during the same clock cycle), the decoded instruction may be transferred from decode unit 76 to execution unit 78. In this manner, the decoded instruction and the operands are typically provided to execution unit 78 at the same time (e.g., during the same clock cycle).

Execution unit 78 executes decoded instructions provided by decode unit 76. Execution unit 78 may also be used to form addresses for memory operands, and may provide the memory operand addresses to data cache 54 (FIG. 5). As described above, data cache 54 may be responsible for providing memory operands to execution unit 78. Data cache 54 may provide the memory operand addresses to paging hardware within the memory management unit for translation from virtual addresses to physical addresses. If the value of a memory operand is not present in data cache 54, data cache 54 may provide the memory operand address to interface unit 56 for retrieval from memory 36 (FIG. 4) via north bridge 34 (FIG. 4).

Execution unit 78 provides any results of instruction executions either to register file 60 or to data cache 54 (FIG. 5). If the result is a value to be stored in a register, execution unit 78 provides the result to register file 60. If the result is a value to be stored in a memory location, execution unit 78 provides the result, and the corresponding address of the memory location, to data cache 54. If the contents of the memory location is not present in data cache 54, data cache 54 may provide the result and the corresponding address of the memory location to interface unit 56. Interface unit 56 may store the value in the corresponding memory location of memory 36 (FIG. 4) via north bridge 34 (FIG. 4).

In the embodiment of FIG. 7, register file 60 includes a standard register set 84 and an extended register set 86. Standard register set 84 includes the eight 32-bit general purpose registers EAX, EBX, ECX, EDX, ESP, EBP, ESI, and EDI defined by the x86 architecture. Extended register set 86 may include, for example, eight additional or extended registers. As will be described below, the extended registers of extended register set 86 may be 64-bit registers.

Instruction 80 may be an x86 instruction including 3 bits of register operand identification information to identify each of the eight x86 general purpose register referenced therein. However, the number of extended registers in extended register set 86 exceeds the eight general purpose registers defined by the x86 architecture. Thus the 3 bits of register operand identification information used in instruction 80 to identify a selected one of eight x86 general purpose registers is insufficient to identify a selected one of the extended registers. Prefix portion 82 of instruction 80 is thus used to provide additional register identification information needed to identify a selected one of the extended registers. The encoding of instruction 80, including prefix portion 82, may thus identify each extended register referenced therein.

When CPU 32 (FIG. 5) is operating in REX32 mode and instruction 80 identifies a register source operand but does not include optional prefix portion 82, decode unit 76 requests the contents of a corresponding standard register of standard register set 84 from register file 60. The execution of instruction 80 is thus carried out using the standard register from standard register set 84 of register file 60. On the other hand, when CPU 32 is operating in REX32 mode and instruction 80 includes optional prefix portion 82 and references a register source operand, decode unit 76 requests the contents of a corresponding extended register of extended register set 86 from register file 60. The execution of instruction 80 is thus carried out using the extended register from extended register set 86 of register file 60.

Decode unit 76 may generate and provide an operand size signal to execution unit 78 indicating the operand size for instruction 80. Decode unit 76 may receive the operating mode signal generated by decode CONTROL UNIT 58 and indicating the operating mode of CPU 32. When the operating mode signal indicates CPU 32 is operating in REX32 mode, and instruction 80 includes prefix portion 82, decode unit 76 may, for example, assert the operand size signal indicating that the operand size for instruction 80 is 64 bits. When the operating mode signal indicates CPU 32 is operating in REX32 mode, and instruction 80 does not include prefix portion 82, decode unit 76 may, for example, deassert the operand size signal indicating that the operand size for instruction 80 is 32 bits.

When the operand size signal is asserted, execution unit 78 may perform operations involving 64 bit operands. Execution unit 78 may receive 64-bit extended register operands from register file 60, and may store 64-bit extended register result values within register file 60. On the other hand, when the operand size signal is deasserted, execution unit 78 may perform operations involving 32-bit operands. Execution unit 74 may receive 32-bit register operands from register file 60, and may store 32-bit register result values within register file 60.

Execution unit 78 may "pad" 32-bit memory operand values received from data cache 54 with leading zeros to form 64-bit operands. Execution unit 78 may also provide the lower ordered (i.e., least significant) 32 bits of 64-bit memory result values to data cache 54 for storage. Alternately, execution unit 78 may provide the operand size signal to data cache 54, and the sizes of memory operands conveyed between execution core 52 and data cache 54 may depend upon the operand size signal. For example; when the operand size signal is asserted, execution unit 78 may obtain 64-bit memory operands from data cache 54, and may provide 64-bit memory result values to data cache 54. On the other hand, when the operand size signal is deasserted, execution unit 78 may obtain 32-bit memory operands from data cache 54, and may provide 32-bit memory result values to data cache 54.

Decode unit 76 may also generate an exception signal dependent upon the operating mode signal and the presence or absence of prefix portion 82 in instruction 80. When instruction 80 includes prefix portion 82 and the operating mode signal indicates CPU 32 is not operating in REX32 mode, decode unit 76 may, for example, assert the exception signal. The asserted exception signal may result in a "device not available" exception.

Figure 8:
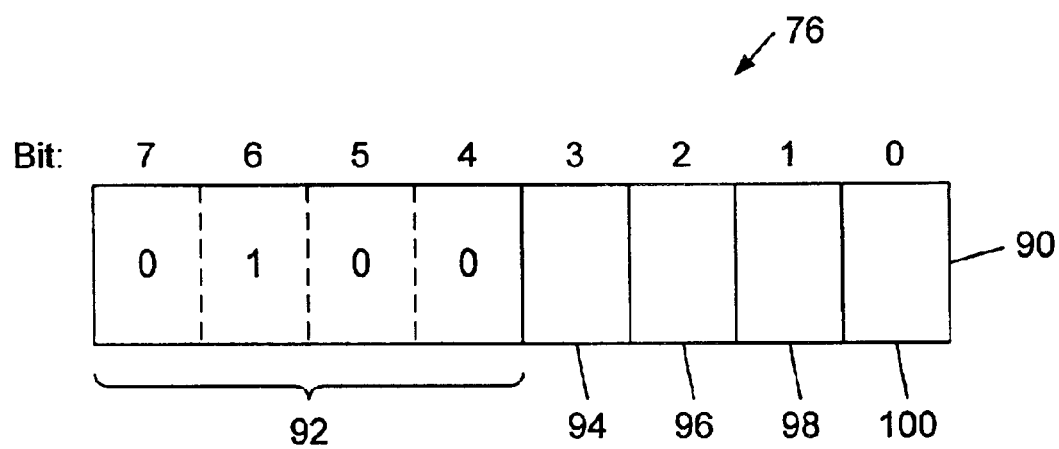
FIG. 8 is a diagram of one embodiment of the optional prefix portion of the instruction of FIG. 7, wherein the prefix portion is an extended register prefix byte including an extended register key field, a 64-bit operand size override bit, and three field extension bits.

FIG. 8 is a diagram of one embodiment of optional prefix portion 82 of instruction 80 of FIG. 7. In the embodiment of FIG. 8, prefix portion 82 is an extended register prefix byte 90 including an extended register key field 92, a 64-bit operand size override bit 94, and three field extension bits 96, 98, and 100. Extended register key field 92 occupies bits 4–7 of extended register prefix byte 90, and a binary extended register key value of '0100' in extended register key field 92 as shown in FIG. 8 is used to identify extended register prefix byte 90. Decode unit 76 recognizes extended register prefix byte 90 via the extended register key value of '0100' in extended register key field 92. When extended register key field 92 does not include extended register key value '0100', decode unit 76 does not recognize the prefix byte as an extended register prefix byte.

64-bit operand size override bit 94 occupies bit 3 of extended register prefix byte 90. 64-bit operand size override bit 94 may be used, for example, to override the default 32-bit operand size for instruction 80 (FIG. 7) including extended register prefix byte 90 such that 64-bit register operands are accessed within register file 60 (FIG. 7). Field extension bits 96, 98, and 100 may be used to extend. 3-bit fields in an opcode, a Mod R/M byte, and/or a SIB byte of instruction 80 to 4 bits, thus allowing 16 registers to be accessed instead of just 8. Field extension bits 96, 98, and 100 may thus be used to increase the number of general purpose registers in CPU 32 (FIGS. 4 and 5).

When CPU 32 is in REX 32 mode, instruction 80 includes extended register prefix byte 90, extended register key field 92 of extended register prefix byte 90 includes extended register key value '0100', and 64-bit operand size override bit 94 of extended register prefix byte 90 is a logic '0', register operand sizes in instruction 80 are assumed to include the default 32 bits, and 32-bit register operands are fetched for instruction 80 from register file 60. On the other hand, when the value of 64-bit operand size override bit 94 is a logic '1', the default 32-bit operand size is overridden for instruction 80, and 64-bit operands are fetched for instruction 80 from register file 60.

Field extension bits 96, 98, and 100 occupy respective bits 2, 1, and 0 of extended register prefix byte 90. Field extension bit 96 may be used, for example, to extend the Mod R/M byte REG field from three bits to four, thus forming an extended REG field. Field extension bit 96 may form the most significant bit of the extended REG field. While the 3-bit REG field is used to access one of 8 different registers within register file 60, the 4 bit extended REG field may be used to access one of 16 different registers within register file 60.

Field extension bit 98 may be used, for example, to extend the SIB byte INDEX field from three bits to four, thus forming an extended INDEX field. Field extension bit 98 may form the most significant bit of the extended INDEX field. While the 3-bit INDEX field is used to access one of 8 different registers within register file 60, the 4-bit extended INDEX field may be used to access one of 16 different registers within register file 60.

Field extension bit 100 may be used, for example, to extend the Mod R/M byte R/M field, the SIB byte BASE field, or an opcode register reference field from three bits to four, thus forming an extended field. Field extension bit 100 may form the most significant bit of the extended field. While the 3-bit field is used to access one of 8 different registers within register file 60, the 4-bit extended field may be used to access one of 16 different registers within register file 60.

Figure 9:
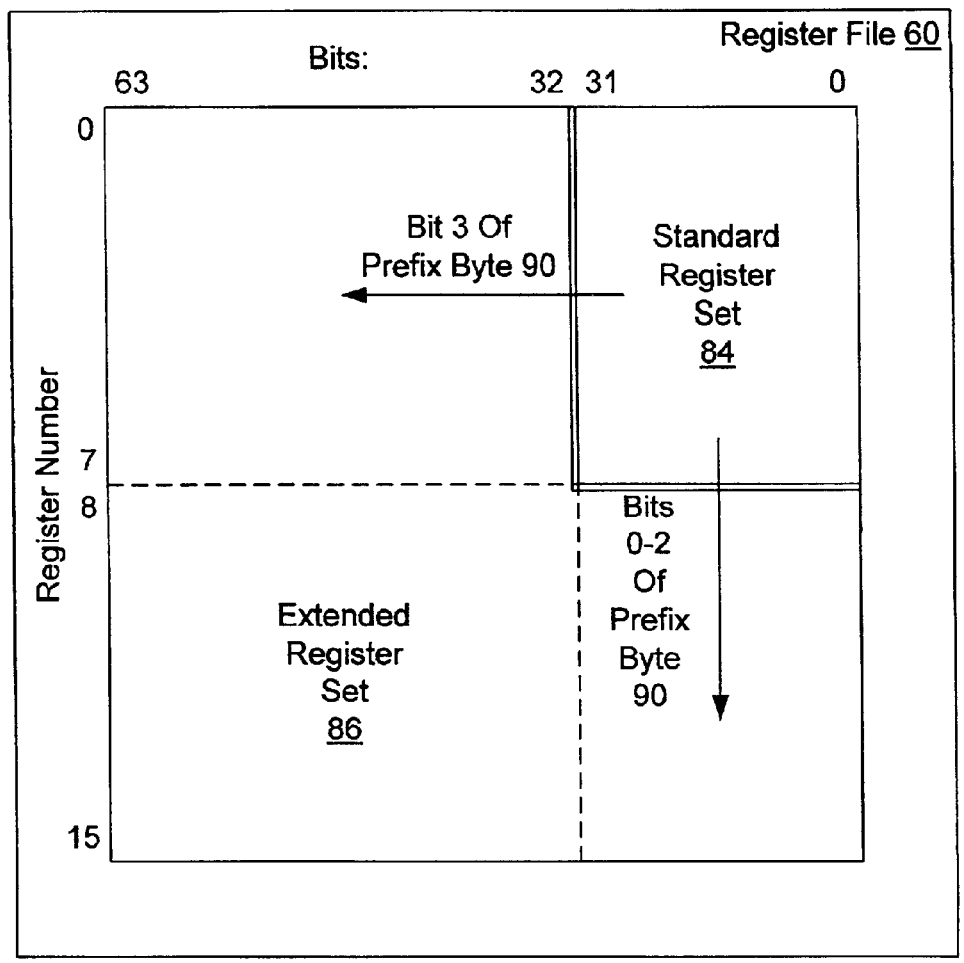
FIG. 9 is a diagram of one embodiment of the register file of FIG. 7 wherein the standard register set is a subset of the extended register set.

FIG. 9 is a diagram of one embodiment of register file 60 of FIG. 7 wherein standard register set 84 is a subset of extended register set 86. As described above, standard register set 84 includes eight 32-bit x86 registers EAX, ECX, EDX, EBX, ESP, EBP, ESI, and EDI, respectively numbered 0–7. Extended register set 80 includes sixteen 64-bit registers numbered 0–15. The 32-bit registers 0–7 of standard register set 84 form lower ordered (i.e., least significant) 32-bit portions of respective 64-bit registers 0–7 of extended register set 86. As illustrated in FIG. 9, extended register set 86 is a superset of standard register set 84.

FIG. 9 also illustrates the effect of extended register prefix byte 90 of FIG. 8 on registers within register file 60. Bits 0–2 (field extension bits 100, 98, and 96 respectively) of extended register prefix byte 90 allow instruction 80 to identify selected registers of extended register set 86. When bit 3 (i.e., 64-bit operand size override bit 94) of extended register prefix byte 90 is cleared (i.e., a logic '0'), only the lower ordered (i.e., least significant) 32 bits of the extended registers in extended register set 86 are accessed. On the other hand, when bit 3 (i.e., 64-bit operand size override bit 94) of extended register prefix byte 90 is set (i.e., a logic '1'), the entire 64 bits of the extended registers in extended register set 86 are accessed.

Figure 10:
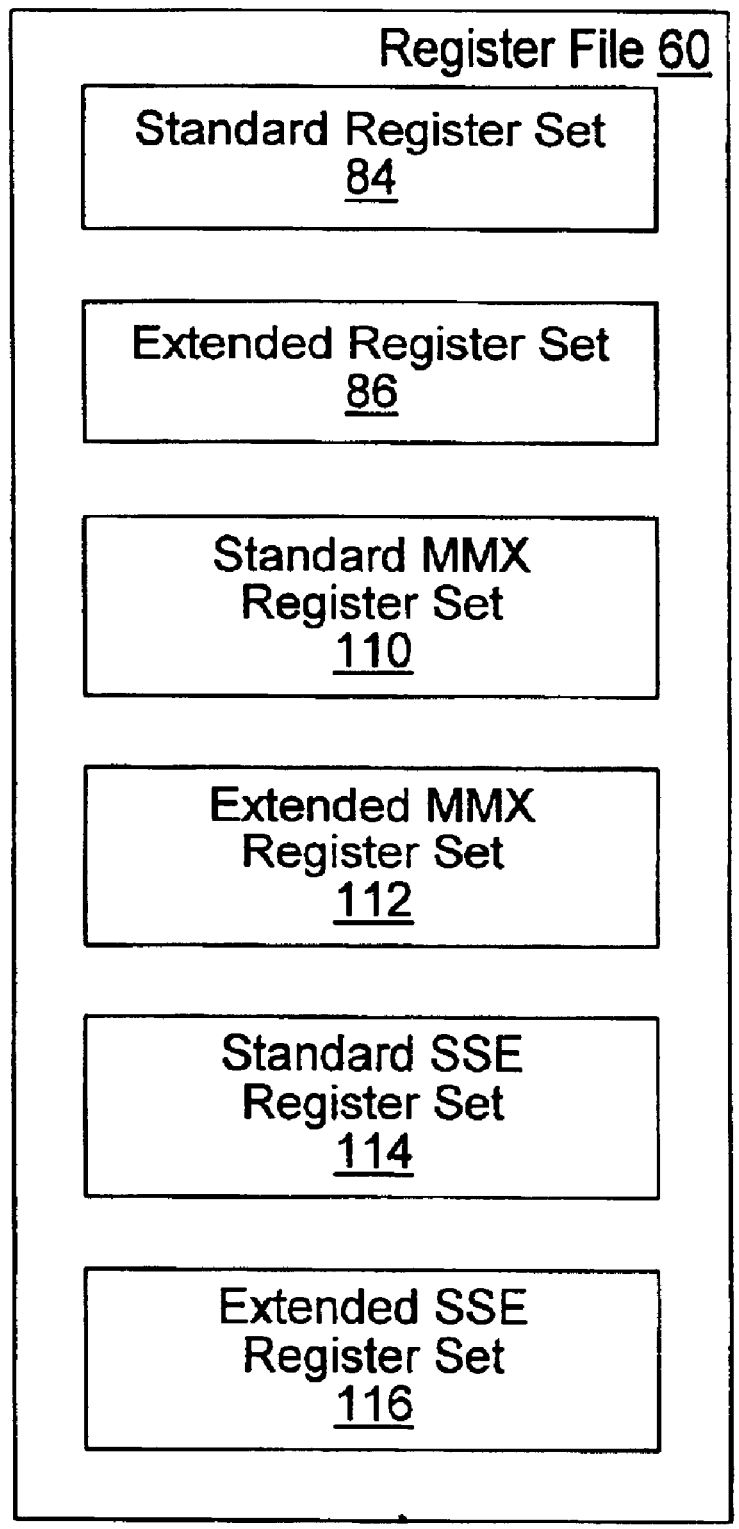
FIG. 10 is a diagram of another embodiment of the register file of FIG. 7, wherein the register file includes the standard register set and the extended register set, and also includes a standard multimedia extensions (MMX) register set, an extended MMX register set, a standard streaming single-instruction-multiple-data (SIMD) extensions or SSE register set, and an extended SSE register set.
Figure 11:
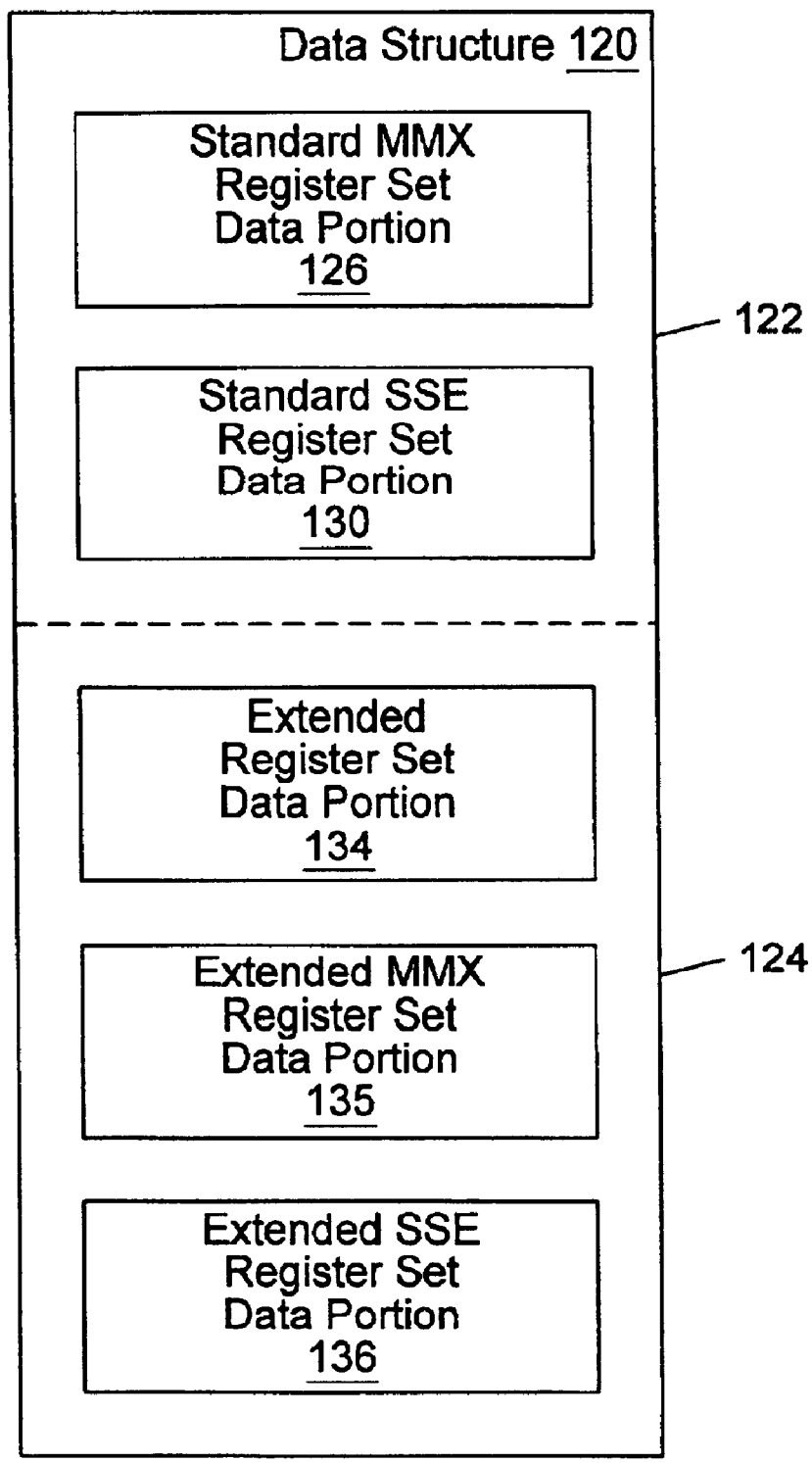
FIG. 11 is a diagram of one embodiment of the a data structure formed in memory and used to store register contents during a context switch, wherein the data structure is used to store the contents of the standard MMX register set, the extended MMX register set, and the standard SSE register set, the extended SSE register set, and wherein a previously unused portion of the data structure is used to store the contents of the extended register set.

A problem may arise in implementing extended register set 86 of register file 60 (FIG. 7) in that a 32-bit operating system of CPU 32 (FIG. 5) is most likely unaware of the extended registers, and may thus make no attempt to save the extended registers during context switches. FIGS. 10 and 11 will now be used to describe a system and method for saving the contents of the extended resisters of extended register set 86 during context switches when CPU 32 (FIG. 5) includes a 32-bit operating system. It is noted that in this illustration the standard MMX register set 110 and the standard SSE register set 114 may be extended in a manner similar to the way in which the standard register set 84 is extended, as described above (and extended register sets 112 and 116, or either, if provided). During a context switch, the operating system causes CPU 32 to stop executing instructions of a first program or task and starts executing instructions of a second program or task. The operating system saves the state of CPU 32 during the context switch so that instruction execution of the first program or task may be reinitiated at a later time. However, the 32-bit operating system may be unaware of the extended registers of the extended register set 86 as described above, and may thus make no attempt to save the extended registers during the context switch.

FIG. 10 is a diagram of another embodiment of register file 60 of FIG. 7 wherein register file 60 includes standard register set 84 and extended register set 86 described above. In the embodiment of FIG. 10, register file 60 also includes a standard multimedia extensions (MMX) register set 110, and extended MMX register set 112, a standard streaming single-instruction-multiple-data (SIMD) extensions or SSE register set 114, and an extended SSE register set 116.

During a context switch, a typical 32-bit operating system saves state information of CPU 32 needed to restore the interrupted program or task in a task state segment (TSS) or on the program's stack (explicitly) formed in memory 36 (FIG. 4). The TSS includes the contents of the general purpose EAX, EBX, ECX, EDX, ESP, EBP, ESI, and EDI registers prior to the context switch, and thus includes the contents of the standard registers of standard register set 84. As described above, the 32-bit operating system is most likely unaware of the extended registers of extended register set 86 (and of extended register sets 112 and 116), and thus may make no attempt to save the contents of the extended registers of extended register set 86 during the context switch.

The 32-bit operating system most likely uses the available x86 "FXSAVE" instruction to store the contents of the standard MMX registers of standard MMX register set 110 and the standard SSE registers of the standard SSE register set 114 in a special 512 byte data structure formed in memory 36 during the context switch. The 32-bit operating system most likely uses the available x86 "FXRSTOR" instruction to restore the contents of the standard MMX registers of standard MMX register set 110 and the standard SSE registers of the standard SSE register set 114 using data stored in the 512 byte data structure via the FXSAVE instruction. As is typical, the FXSAVE and FXRSTOR instructions may be implemented in CPU 32 via microcode. In one embodiment, this microcode is extended to save (and restore) the contents of the extended register sets 86, 112, and/or 114. Thus the 32-bit operating system, executing the x86 FXSAEV and FXRSTOR instructions to save and restore the contents of the standard MMX registers of standard MMX register set 110 and the standard SSE registers of the standard SSE register set 114 during context switches, may also cause the contents of the registers of extended register set 86, extended MMX register set 112, and extended SSE register set 116 to be saved and restored.

FIG. 11 is a diagram of one embodiment of a special 512 byte data structure, labeled 120, formed in memory and used to store register contents (conventionally, the contents of the standard MMX registers and the standard SSE registers in the x86 architecture). Data structure 120 includes a used portion 122 and a previously unused portion 124. A standard MMX register set data portion 126 and a standard SSE register set data portion 130 exist in used portion 122 for storing the contents of the registers of standard MMX register set 110 and standard SSE register set 114 (FIG. 10). As depicted in FIG. 11, the previously unused-portion 124 of data structure 120 may be used to store the contents of the extended register sets 86, 112, and 116 on context switches in storage regions 134, 135 and 136, respectively. In this way, the 32-bit operating system, executing the x86 FXSAVE and FXRSTOR instructions to save and restore the contents of the standard MMX and SSE registers during context switches, also saves and restores the contents of the extended register sets.

What is claimed is:

1. A central processing unit (CPU) comprising:
  a register file including a standard register set and an extended register set, wherein the standard register set comprises a plurality of standard registers, and wherein the extended register set comprises a plurality of extended registers; and
  an execution core coupled to the register file and to receive a signal indicating an operating mode of the CPU, wherein the execution core is configured to fetch and execute instructions, and wherein the execution core is configured to respond to an instruction by accessing at least one extended register if the signal indicates the CPU is operating in an extended register mode and the instruction includes a prefix portion including information needed to access the at least one extended register;
  wherein the number of standard registers is less than or equal to a number of general purpose registers defined by a CPU architecture, and wherein the number of extended registers is greater than the number of general purpose registers defined by the CPU architecture.

2. The CPU as recited in claim 1, wherein the instruction absent the prefix portion includes register identification information sufficient to identify a selected one of the standard registers, and wherein the prefix portion of the instruction includes additional register identification information needed to identify a selected one of the extended registers.

3. The CPU as recited in claim 1, wherein the encoding of the instruction, including the prefix portion, identifies the at least one extended register accessed by the execution core.

4. The CPU as recited in claim 1, wherein the standard register set comprises eight 32-bit general purpose registers defined by the x86 architecture.

5. The CPU as recited in claim 4, wherein the eight 32-bit general purpose registers include the EAX, EBX, ECX, EDX, ESP, EBP, ESI, and EDI registers.

6. The CPU as recited in claim 4, wherein the standard register set comprises eight 32-bit general purpose registers defined by the x86 architecture, and wherein the extended register set includes the eight 32-bit general purpose registers of the standard register set and eight additional 32-bit registers not defined by the x86 architecture.

7. The CPU as recited in claim 1, wherein the execution core is configured to fetch and execute variable-length x86 instructions.

8. The CPU as recited in claim 1, wherein the prefix portion comprises an extended register prefix byte, and wherein the extended register prefix byte comprises an extended register key field, and wherein the contents of the extended register key field indicates whether or not the extended register prefix byte includes the information needed to access the at least one extended register.

9. The CPU as recited in claim 8, wherein the extended register prefix byte includes the information needed to access the at least one extended register only when the extended register key field contains a predetermined extended register key value.

10. The CPU as recited in claim 1, further comprising:
  a control register for storing information indicating whether or not the extended register mode is globally enabled;
  a flags register for storing information indicating whether or not the extended register mode is enabled by a current process; and
  generating means for generating the signal indicating the operating mode of the CPU, wherein the signal indicates the CPU is operating in the extended register mode if the extended register mode is globally enabled and enabled by the current process.

11. A central processing unit (CPU) comprising:
  a register file including a standard register set and an extended register set, wherein the standard register set comprises a plurality of 32-bit general purpose registers defined by the x86 architecture, and wherein the extended register set comprises a plurality of extended registers, and wherein the number of extended registers is greater than the number of general purpose registers defined by the x86 architecture; and
  an execution core coupled to the register file and to receive a signal indicating an operating mode of the CPU, wherein the execution core is configured to fetch and execute variable-length x86 instructions, and wherein the execution core is configured to respond to an instruction by accessing at least one extended register if the signal indicates the CPU is operating in an extended register mode and the instruction includes an extended register prefix byte including information needed to access the at least one extended register;
  wherein the instruction absent the extended register prefix byte includes register identification information sufficient to identify a selected one of the standard registers, and wherein the extended register prefix byte includes additional register identification information needed to identify a selected one of the extended registers.

12. The CPU as recited in claim 11, wherein the encoding of the instruction, including the extended register prefix byte, identifies the at least one extended register accessed by the execution core.

13. The CPU as recited in claim 11, wherein the standard register set comprises the EAX, EBX, ECX, EDX, ESP, EBP, ESI, and EDI registers defined by the x86 architecture.

14. The CPU as recited in claim 11, wherein the standard register set comprises eight 32-bit general purpose registers defined by the x86 architecture, and wherein the extended register set includes the eight 32-bit general purpose registers of the standard register set and eight additional 32-bit registers not defined by the x86 architecture.

15. The CPU as recited in claim 11, wherein the extended register prefix byte comprises an extended register key field, and wherein the contents of the extended register key field indicates whether or not the extended register prefix byte includes the information needed to access the at least one extended register.

16. The CPU as recited in claim 15, wherein the extended register prefix byte includes the information needed to access the at least one extended register only when the extended register key field contains a predetermined extended register key value.

17. The CPU as recited in claim 11, further comprising:
  a control register for storing information indicating whether or not the extended register mode is globally enabled;
  a flags register for storing information indicating whether or not the extended register mode is enabled by a current process; and
  generating means for generating the signal indicating the operating mode of the CPU, wherein the signal indicates the CPU is operating in the extended register mode if the extended register mode is globally enabled and enabled by the current process.

18. A central processing unit (CPU) comprising:
a register file including a standard register set and an extended register set, wherein the standard register set comprises a plurality of general purpose registers defined by a CPU architecture, and wherein the extended register set comprises a plurality of extended registers, and wherein the number of extended registers is greater than the number of general purpose registers defined by the CPU architecture, and wherein a width of the extended registers is greater than a width of the general purpose registers defined by the CPU architecture; and
an execution core coupled to the register file and to receive the signal indicating the operating mode of the CPU, wherein the execution core is configured to fetch and execute instructions, and wherein the execution core is configured to respond to an instruction by accessing the entire contents of at least one extended register if: (i) the signal indicates the CPU is operating in an extended register mode, (ii) the instruction includes a prefix portion including information needed to access the at least one extended register, and (iii) the prefix portion includes an indication that the entire contents of the least one extended register is to be accessed.

19. The CPU as recited in claim 18, wherein the CPU architecture is the x86 architecture, and wherein the width of the general purpose registers is 32 bits, and wherein the width of the extended registers is 64 bits.

20. The CPU as recited in claim 19, wherein the standard register set includes the EAX, EBX, ECX, EDX, ESP, EBP, ESI, and EDI registers defined by the x86 architecture.

21. The CPU as recited in claim 20, wherein the standard register set is a subset of the extended register set, and wherein the standard registers form lower ordered portions of extended registers.

22. The CPU as recited in claim 18, wherein the instruction absent the prefix portion includes register identification information sufficient to identify a selected one of the standard registers, and wherein the prefix portion of the instruction includes additional register identification information needed to identify a selected one of the extended registers.

23. The CPU as recited in claim 18, wherein the encoding of the instruction, including the prefix portion, identifies the at least one extended register accessed by the execution core.

24. The CPU as recited in claim 18, wherein the execution core is configured to fetch and execute variable-length x86 instructions.

25. The CPU as recited in claim 18, wherein the prefix portion comprises an extended register prefix byte, and wherein the extended register prefix byte comprises: (i) an extended register key field, wherein the contents of the extended register key field indicates whether or not the extended register prefix byte includes the information needed to access the at least one extended register, and (ii) an operand size override bit, wherein the value of the operand size override bit indicates whether or not the entire contents of the least one extended register is to be accessed.

26. The CPU as recited in claim 18, wherein the extended register prefix byte includes the information needed to access the at least one extended register and the indication that the entire contents of the least one extended register is to be accessed only when the extended register key field contains a predetermined extended register key value.

27. The CPU as recited in claim 18, further comprising:
a control register for storing information indicating whether or not the extended register mode is globally enabled;
a flags register for storing information indicating whether or not the extended register mode is enabled by a current process; and
generating means for generating the signal indicating the operating mode of the CPU, wherein the signal indicates the CPU is operating in the extended register mode if the extended register mode is globally enabled and enabled by the current process.

28. A central processing unit (CPU) comprising:
a register file including a standard register set and an extended register set, wherein the standard register set comprises a plurality of standard registers, and wherein the extended register set comprises a plurality of extended registers; and
an execution core coupled to the register file and to receive a signal indicating an operating mode of the CPU, wherein the execution core is configured to fetch and execute instructions, and wherein the execution core is configured to respond to an instruction by accessing at least one extended register if the signal indicates the CPU is operating in an extended register mode and the instruction includes a prefix portion including information needed to access the at least one extended register;
wherein the instruction absent the prefix portion includes register identification information sufficient to identify a selected one of the standard registers, and wherein the prefix portion of the instruction includes additional register identification information needed to identify a selected one of the extended registers.

29. The CPU as recited in claim 28, wherein the standard register set comprises eight 32-bit general purpose registers defined by the x86 architecture.

30. A central processing unit (CPU) comprising:
a register file including a standard register set and an extended register set, wherein the standard register set comprises a plurality of standard registers, and wherein the extended register set comprises a plurality of extended registers; and
an execution core coupled to the register file and to receive a signal indicating an operating mode of the CPU, wherein the execution core is configured to fetch and execute instructions, and wherein the execution core is configured to respond to an instruction by accessing at least one extended register if the signal indicates the CPU is operating in an extended register mode and the instruction includes a prefix portion including information needed to access the at least one extended register;
wherein the standard register set comprises eight 32-bit general purpose registers defined by the x86 architecture;
wherein the eight 32-bit general purpose registers include the EAX, EBX, ECX, EDX, ESP, EBP, ESI, and EDI registers; and
wherein the extended register set includes the eight 32-bit general purpose registers of the standard register set and eight additional 32-bit registers not defined by the x86 architecture.

31. The CPU as recited in claim 30, wherein the instruction absent the prefix portion includes register identification information sufficient to identify a selected one of the standard registers, and wherein the prefix portion of the instruction includes additional register identification information needed to identify a selected one of the extended registers.

32. A central processing unit (CPU) comprising:
a register file including a standard register set and an extended register set, wherein the standard register set comprises a plurality of standard registers, and wherein the extended register set comprises a plurality of extended registers; and
an execution core coupled to the register file and to receive a signal indicating an operating mode of the CPU, wherein the execution core is configured to fetch and execute instructions, and wherein the execution core is configured to respond to an instruction by accessing at least one extended register if the signal indicates the CPU is operating in an extended register mode and the instruction includes a prefix portion including information needed to access the at least one extended register,
wherein the prefix portion comprises an extended register prefix byte, and wherein the extended register prefix byte comprises an extended register key field, and wherein the contents of the extended register key field indicates whether or not the extended register prefix byte includes the information needed to access the at least one extended register.

33. The CPU as recited in claim 32, wherein the extended register prefix byte includes the information needed to access the at least one extended register only when the extended register key field contains a predetermined extended register key value.

34. A central processing unit (CPU) comprising:
a register file including a standard register set and an extended register set, wherein the standard register set comprises a plurality of standard registers, and wherein the extended register set comprises a plurality of extended registers;
an execution core coupled to the register file and to receive a signal indicating an operating mode of the CPU, wherein the execution core is configured to fetch and execute instructions, and wherein the execution core is configured to respond to an instruction by accessing at least one extended register if the signal indicates the CPU is operating in an extended register mode and the instruction includes a prefix portion including information needed to access the at least one extended register;
a control register for storing information indicating whether or not the extended register mode is globally enabled;
a flags register for storing information indicating whether or not the extended register mode is enabled by a current process; and
generating means for generating the signal indicating the operating mode of the CPU, wherein the signal indicates the CPU is operating in the extended register mode if the extended register mode is globally enabled and enabled by the current process.

35. A central processing unit (CPU) comprising:
a register file including a standard register set and an extended register set, wherein the standard register set comprises a plurality of 32-bit general purpose registers defined by the x86 architecture, and wherein the extended register set comprises a plurality of extended registers, and wherein the number of extended registers is greater than the number of general purpose registers defined by the x86 architecture; and
an execution core coupled to the register file and to receive a signal indicating an operating mode of the CPU, wherein the execution core is configured to fetch and execute variable-length x86 instructions, and wherein the execution core is configured to respond to an instruction by accessing at least one extended register if the signal indicates the CPU is operating in an extended register mode and the instruction includes an extended register prefix byte including information needed to access the at least one extended register;
wherein the standard register set comprises eight 32-bit general purpose registers defined by the x86 architecture, and wherein the extended register set includes the eight 32-bit general purpose registers of the standard register set and eight additional 32-bit registers not defined by the x86 architecture.

36. The CPU as recited in claim 35, wherein the instruction absent the extended register prefix byte includes register identification information sufficient to identify a selected one of the standard registers, and wherein the extended register prefix byte includes additional register identification information needed to identify a selected one of the extended registers.

37. A central processing unit (CPU) comprising:
a register file including a standard register set and an extended register set, wherein the standard register set comprises a plurality of 32-bit general purpose registers defined by the x86 architecture, and wherein the extended register set comprises a plurality of extended registers, and wherein the number of extended registers is greater than the number of general purpose registers defined by the x86 architecture; and
an execution core coupled to the register file and to receive a signal indicating an operating mode of the CPU, wherein the execution core is configured to fetch and execute variable-length x86 instructions, and wherein the execution core is configured to respond to an instruction by accessing at least one extended register if the signal indicates the CPU is operating in an extended register mode and the instruction includes an extended register prefix byte including information needed to access the at least one extended register;
wherein the extended register prefix byte comprises an extended register key field, and wherein the contents of the extended register key field indicates whether or not the extended register prefix byte includes the information needed to access the at least one extended register.

38. The CPU as recited in claim 37, wherein the extended register prefix byte includes the information needed to access the at least one extended register only when the extended register key field contains a predetermined extended register key value.

39. A central processing unit (CPU) comprising:
a register file including a standard register set and an extended register set, wherein the standard register set comprises a plurality of 32-bit general purpose registers defined by the x86 architecture, and wherein the extended register set comprises a plurality of extended registers, and wherein the number of extended registers is greater than the number of general purpose registers defined by the x86 architecture;
an execution core coupled to the register file and to receive a signal indicating an operating mode of the CPU, wherein the execution core is configured to fetch and execute variable-length x86 instructions, and wherein the execution core is configured to respond to an instruction by accessing at least one extended register if the signal indicates the CPU is operating in an extended register mode and the instruction includes an extended register prefix byte including information needed to access the at least one extended register;
a control register for storing information indicating whether or not the extended register mode is globally enabled;

a flags register for storing information indicating whether or not the extended register mode is enabled by a current process; and generating means for generating the signal indicating the operating mode of the CPU, wherein the signal indicates the CPU is operating in the extended register mode if the extended register mode is globally enabled and enabled by the current process.

* * * * *